Figure 1:
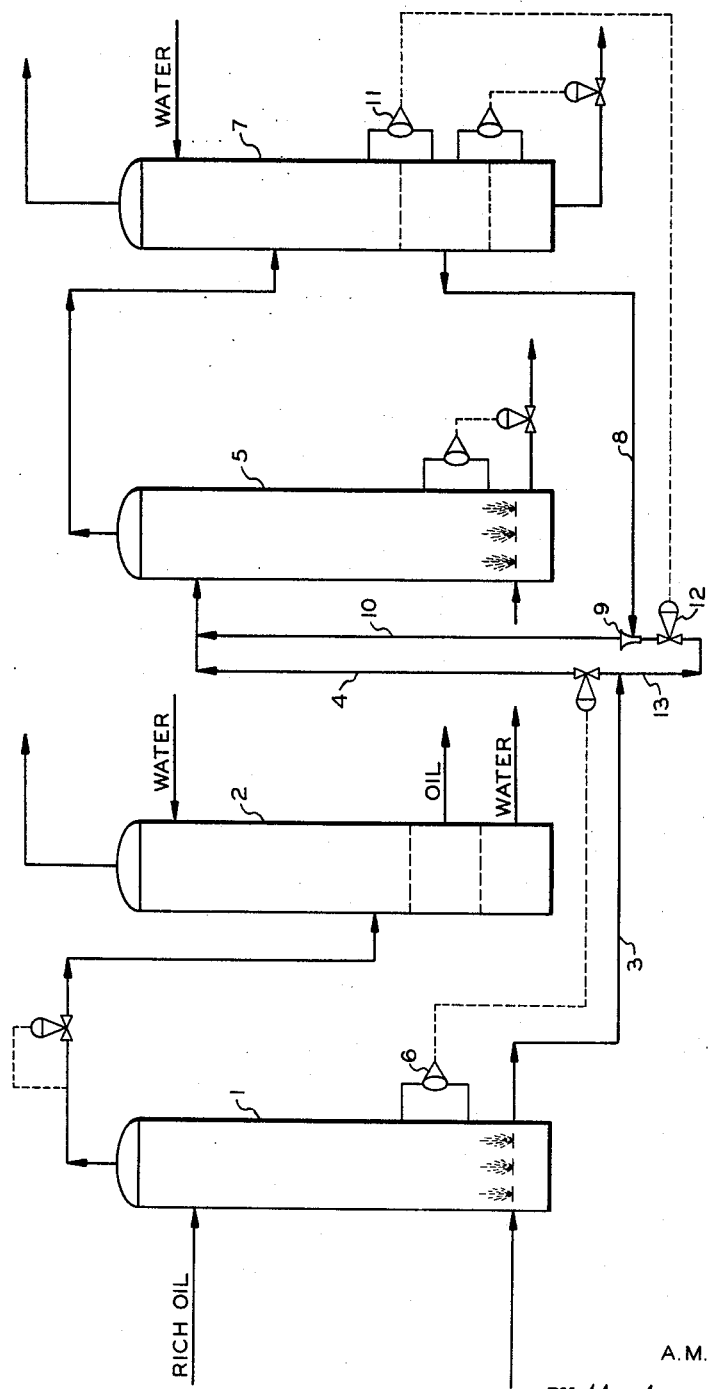

Aug. 16, 1960   A. M. L. KUBE   2,949,423
METHOD FOR RECOVERY OF ABSORPTION OIL
Filed Sept. 23, 1957

INVENTOR.
A. M. LUDWIG KUBE
BY Hudson and Young
ATTORNEYS

United States Patent Office 2,949,423
Patented Aug. 16, 1960

2,949,423

METHOD FOR RECOVERY OF ABSORPTION OIL

Adolph M. L. Kube, Phillips, Tex., assignor to Phillips Petroleum Company, a corporation of Delaware Filed Sept. 23, 1957, Ser. No. 685,569

8 Claims. (Cl. 208—341)

This invention relates to an improved method for the recovery of absorption oil in a natural gasoline absorption system. In one of its aspects, it relates to an improved method for recycling absorption oil from the low pressure dephlegmator to the low pressure stripper in a two-stage absorption oil stripping process. In another aspect, the invention relates to an improved method for returning absorption oil from the low pressure dephlegmator to the low pressure stripper in a two-stage absorption oil stripping operation without substantially changing the temperature of the oil.

In conventional natural gasoline absorption systems, the solvent commonly used is a petroleum oil having an initial boiling point of about 350° F. and a final boiling point of about 450° F. In gasoline absorption plants, the absorption oil is circulated at the rate of about 30 to 40 gallons of absorption oil per 1000 cubic feet of gas treated, and it is not unusual for the entire charge of absorption oil in the operating cycle to be recirculated as many as 100 times per day. In high pressure gasoline absorption plants, the rich oil from the absorbers is usually partially stripped in a high pressure stripper or still and the partially stripped oil recovered from the bottom of the high pressure stripper is passed to a low pressure stripper for final separation of gasoline and absorption oil. A portion of the absorbed natural gasoline is freed from the absorbent by the stripping operation in the high pressure still and passes to the dephlegmator wherein absorption oil which has been carried overhead with the gasoline vapors is condensed and separated from the gasoline vapors. The absorption oil which accumulates in the high pressure dephlegmator is passed directly to the low pressure still. Lean oil is recovered from the bottom of the low pressure still and is recycled to the absorber. The overhead vapors from the low pressure still pass to a low pressure dephlegmator wherein absorption oil which has been carried over with the gasoline vapors is condensed and separated from the gasoline vapors. This oil is then returned to the low pressure still or is discarded.

Various attempts have been made to devise a satisfactory method and means for returning the absorption oil, which accumulates in the low pressure dephlegmator, to the low pressure still; however, the prior art has failed to provide a satisfactory method or means. The absorption oil which accumulates in the low pressure dephlegmator contains dissolved gasoline components and, therefore, has a high vapor pressure. Efforts to use centrifugal pumps in this service have not been satisfactory because, due to the vapor pressure of the liquid being pumped, the centrifugal pumps are subject to vapor lock and consequently need to be overdesigned to the point where power requirements make their use uneconomical. Positive displacement pumps have also been tried in this service and are also unsuccessful since these pumps are subject to the same vapor locking tendencies as the centrifugal pumps. It has been proposed to cool the absorption oil taken from the low pressure dephlegmator before being pumped to the low pressure still so as to avoid the flashing tendency of the hot oil; however, the cost of cooling this stream and then reheating the stream in the low pressure still makes this procedure uneconomical and unattractive.

It is therefore, a principal object of this invention to provide an improved method for returning absorption oil from the low pressure dephlegmator to the low pressure still in a two-stage absorption oil stripping process. It is another object to provide a method for avoiding flashing of the oil being recycled from the low pressure dephlegmator to the low pressure still. Still another object of the invention is the provision of a means for effecting recycle of the absorption oil from the low pressure dephlegmator to the low pressure still. Other objects and advantages of this invention will be apparent to one skilled in the art upon studying this disclosure, including the detailed description and the drawing.

The drawing shows one form of apparatus in which my invention can be carried out.

The invention is a result of the discovery that the absorption oil accumulated in the low pressure dephlegmator can be returned to the low pressure still by means of an injector or ejector type of jet pump wherein the partially stripped rich oil from the first or high pressure stripper is used as the power fluid for introducing the absorption oil to the low pressure still. It is surprising that a jet pump will successfully transport the absorption oil from the low pressure dephlegmator to the low pressure still because the power fluid, in the form of the partially stripped rich oil from the high stage stripper, is at a considerably higher temperature than that of the absorption oil being transported. I do not understand the theory of operation of the device of my invention but I have found that a jet pump will successfully transport the absorption oil from the low pressure dephlegmator to the low pressure still where a centrifugal pump or a positive displacement pump have failed to operate successfully.

As an aid to a better understanding of the general nature of the invention with respect to both the apparatus and mode of operation, reference is now made to the drawing wherein a high pressure still 1, high pressure dephlegmator 2, low pressure still 5, and low pressure dephlegmator 7 comprise the principal conventional elements in an absorption process such as the absorption of natural gasoline components in an absorbent such as mineral seal oil. The rich oil is supplied to the high pressure stripper from a conventional absorption step which is not shown. The stripping stills and dephlegmators are of conventional design and rich oil from the absorbers is fed to the high pressure still 1 wherein the natural gasoline components are at least partially stripped therefrom by the action of steam admitted near the lower portion of the still and the gasoline components are removed overhead to dephlegmator 2 wherein the absorption oil which is carried over by entrainment or vaporization is condensed by a stream of water introduced in the upper portion of the dephlegmator, is gathered at the lower portion of the dephlegmator, and is passed directly to low pressure still 5. Partially stripped absorption oil is removed from the bottom of high pressure still 1 via conduit 3 and this stream is divided so that a portion of the stream is passed to low pressure still 5 via conduit 4 and the remaining portion is passed via conduit 13 through the pressure inlet of jet pump 9 and conduit 10 so as to rejoin the stream in conduit 4 being introduced to low pressure still 5. The absorption oil is substantially completely denuded of gasoline components in low pressure still 5 and lean oil is removed from the bottom of still 5 and is returned to the absorption step (not shown). The gasoline components are removed from low pressure still 5 as an overhead vapor product which carries with it entrained and vaporized absorption oil. This stream is passed to the low pressure dephlegmator 7 wherein the absorption oil is condensed by action thereon of water so as to form a layer of absorption oil in the lower portion of low pressure dephlegmator 7. The absorption oil which collects in the lower portion of low pressure dephlegmator 7 passes via conduit 8 to the suction inlet of jet pump 9 and is transported along with the partially stripped high pressure stripper bottom products to the low pressure still. The quantity of partially stripped rich oil which passes from high pressure still 1 via conduit 4 is governed by liquid level controller 6 positioned in high pressure still 1 which controls a motor valve in conduit 4. The quantity of partially stripped rich oil from high pressure still 1 which traverses conduit 13 is governed by a liquid level controller in the lower portion of low pressure dephlegmator 7 which operates motor valve 12 positioned in conduit 13. Gasoline components are removed as vapor from the overhead conduits of high pressure dephlegmator 2 and low pressure dephlegmator 7 and recovered as in conventional operations. Water is removed from the bottom of the dephlegmators as in conventional operations. Lean oil is removed from the bottom of low pressure still 5 and the rate of removal is governed by a liquid level controller as in conventional operation.

The operation and apparatus of the invention will be described as applied to an absorption plant wherein natural gasoline components are absorbed from natural gas using mineral seal oil as the absorbent. In this operation, the high pressure still 1 is operated at a temperature of about 450° F. and 250 p.s.i.g. Rich oil is fed to the high pressure still at a rate of about 1,977,000 gallons per day (g.p.d.). Partially stripped rich oil is removed from high pressure still via conduit 3 at the rate of 1,825,000 g.p.d. and absorbent oil is removed from the lower portion of low pressure dephlegmator 7 at the rate of 144,000 g.p.d. From 0 to 50 percent of the oil passing via conduit 3 is diverted through jet pump 9. The high pressure dephlegmator 2 is operated at about 245 p.s.i.g., a bottom temperature of about 285° F. and a top temperature of about 170 to 185° F. The low pressure still 5 is operated at about 400° F. and 50 p.s.i.g. and the low pressure dephlegmator 7 is operated at about 45 p.s.i.g. with a bottom temperature of about 285° F. and a top temperature of about 170 to 185° F. About 177,000 g.p.d. of natural gasoline is recovered as overhead product from high pressure dephlegmator 2 and low pressure dephlegmator 7.

The jet pump 9 is similar to that shown in a catalogue obtained from Penberthy Injector Company, Detroit, Michigan, and designated as Penberthy Catalogue No. 512R and the pump was similar to that shown on page 12 of the catalogue identified as Model XL-96 design series 180A. The whirling chamber shown in the pressure jet was not used and the discharge was streamlined to the delivery conduit so as to avoid turbulence downstream from the jet. The method and apparatus of the invention has been successfully used in gasoline plants utilizing two-stage stripping wherein centrifugal pumps and positive displacement pumps have failed to operate satisfactorily.

In the drawing, various elements such as pumps, valves, controllers, and the like, have not been illustrated because those skilled in the art will be aware of the need for these conventional items and will know when and where to use them. The discharge from jet pump 9 is shown as being passed via conduit 10 into conduit 4 downstream from the motor valve in conduit 4 which is operated by liquid level control 6; however, conduit 10 can be connected directly to low pressure still 5, if desired.

Reasonable variation and modification of the invention can be practiced within the scope of the disclosure as illustrated and described without departing from the spirit and scope of the invention.

That which is claimed is:

1. The method of transporting oil from a dephlegmator wherein water is the direct contact cooling agent to a still maintained at a temperature and a pressure higher than the temperature and pressure of said dephlegmator which comprises entraining said oil at a temperature at least as high as that of said dephlegmator in a stream of fluid passing to said still as feed therefor so as to impart veloctiy energy to said oil.

2. In the two-stage stripping of rich absorption oil wherein the partially stripped rich oil obtained from a high pressure still is fed to a low pressure still and absorption oil is carried over from the low pressure still and condensed in a low pressure dephlegmator wherein water is the direct contact cooling agent, the improvement comprising ejecting absorption oil withdrawn from said low pressure dephlegmator into said low pressure still by entraining said absorption oil at a temperature at least as high as that of said dephlegmator in the stream of partially stripped rich oil passing from the high pressure still to the low pressure still.

3. In the two-stage stripping of rich absorption oil wherein partially stripped rich oil obtained from a high pressure still is fed to a low pressure still and absorption oil is carried over from the low pressure still and condensed in a low pressure dephlegmator wherein water is the direct contact cooling agent, the improvement comprising ejecting absorption oil withdrawn from said low pressure still by entraining said absorption oil at a temperature at least as high as that of said dephlegmator in a portion of the stream of partially stripped rich oil passing from the high pressure still to the low pressure still; and controlling the quantity of partially stripped rich oil utilized to entrain said absorption oil in accordance with the quantity of absorption oil in said low pressure dephlegmator.

4. For use in a two-stage absorption oil stripping system comprising a high pressure still, a low pressure still and a low pressure dephlegmator wherein water is the direct contact cooling agent, apparatus comprising a jet pump having a pressure connection, a suction connection and a discharge connection; a first conduit connecting a stream of partially stripped rich oil removed from the high pressure still to the pressure connection of said jet pump; a second conduit directly connecting condensed absorption oil in said low pressure dephlegmator to the suction connection of said jet pump; and a third conduit connecting the discharge connection of said jet pump to the interior of said low pressure still.

5. For use in a two-stage absorption oil stripping system comprising a high pressure still having a rich oil inlet and a partially stripped rich oil outlet, a low pressure still having a feed inlet, a gas outlet and an oil outlet, and a low pressure dephlegmator having a feed inlet, a water inlet and an absorption oil outlet, apparatus comprising a first conduit connecting said high pressure still outlet and said low pressure still inlet; a jet pump having a pressure connection, a suction connection and a discharge connection; a second conduit connecting said first conduit and the pressure connection of said jet pump; a first liquid-level control means in operational contact with the liquid in said high pressure still; a first motor valve positioned in said first conduit downstream from the connection of said second conduit and operatively connected to said first liquid-level control means; a third conduit connecting said dephlegmator outlet directly to said suction connection of said jet pump; a second liquid-level control means in operational contact with the absorption oil in said low pressure dephlegmator; a second motor valve positioned in said second conduit and operatively connected to said second liquid-level control means; and a fourth conduit connecting the discharge connection of said jet pump and the interior of said low pressure still.

6. The apparatus of claim 5 wherein said fourth conduit connects the discharge of said jet pump to the interior of said low pressure still via said first conduit downstream from said first motor valve.

7. The apparatus of claim 5 wherein said fourth conduit connects the discharge of said jet pump directly to the interior of said low pressure still.

8. In the two-stage stripping of rich absorption oil to remove and recover components absorbed in said oil and to recover separately said oil wherein said rich oil is partially stripped of absorbed components in a first stripping step, the partially stripped oil from the first stripping step is passed to a second stripping step at a lower pressure than that in said first stripping step and therein substantially completely stripped of absorbed components, and absorption oil entrained with desorbed components and removed from said second stripping step is condensed in a dephlegmating step wherein water is the direct contact cooling agent at a pressure lower than that of said second stripping step, the improvement comprising entraining a stream of absorption oil condensed in said dephlegmating step with the partially stripped oil being passed from said first stripping step to said second stripping step as the sole operation performed upon said stream of condensed oil.

References Cited in the file of this patent

UNITED STATES PATENTS

| | | |
|---|---|---|
| 2,273,412 | McCullogh | Feb. 17, 1942 |
| 2,333,229 | Barton | Nov. 2, 1943 |
| 2,608,270 | McDonald et al. | Aug. 26, 1952 |
| 2,754,246 | Brosamer | July 10, 1956 |
| 2,771,149 | Miller et al. | Nov. 20, 1956 |

OTHER REFERENCES

Perry: Chemical Engineer's Handbook (1950), 3rd Ed., McGraw-Hill Book Co., New York, New York, p. 1439.